(12) United States Patent
Richards et al.

(10) Patent No.: US 7,494,154 B2
(45) Date of Patent: Feb. 24, 2009

(54) POWERED MANEUVERABLE AND RETRACTABLE TRAILER JACK DEVICE

(76) Inventors: Robert E. Richards, 503 Walnut St., Green Camp, OH (US) 43322; Mark J. Quintile, 719 Salem La., Brunswick, OH (US) 44212

( * ) Notice: Subject to any disclaimer, the term of this patent is extended or adjusted under 35 U.S.C. 154(b) by 419 days.

(21) Appl. No.: 11/324,438

(22) Filed: Jan. 3, 2006

(65) Prior Publication Data
US 2007/0152425 A1 Jul. 5, 2007

(51) Int. Cl.
*B60D 1/06* (2006.01)
*B60B 11/10* (2006.01)

(52) U.S. Cl. ............. 280/767; 280/475; 280/476.1; 280/474; 280/764.1; 280/763.1; 280/766.1; 180/11; 180/15; 180/13

(58) Field of Classification Search ........... 280/476.1, 280/475, 767, 474, 764, 763.1, 766.1; 180/11, 180/15, 13
See application file for complete search history.

(56) References Cited

U.S. PATENT DOCUMENTS

| | | | | |
|---|---|---|---|---|
| 2,697,243 A | * | 12/1954 | Shager | 16/33 |
| 3,041,083 A | * | 6/1962 | Blanc | 280/43.21 |
| 3,770,070 A | * | 11/1973 | Smith | 180/13 |
| 3,783,960 A | | 1/1974 | Feliz | |
| 3,861,482 A | * | 1/1975 | Stephens et al. | 180/13 |
| 5,338,047 A | * | 8/1994 | Knisley | 280/3 |
| 6,347,677 B1 | | 2/2002 | Collins | |
| 6,840,541 B2 | * | 1/2005 | Walters | 280/763.1 |
| 6,991,050 B1 | * | 1/2006 | Sanford et al. | 180/13 |
| 7,328,761 B1 | * | 2/2008 | Tyler | 180/13 |
| 2007/0152425 A1 | | 7/2007 | Richards | |

* cited by examiner

*Primary Examiner*—Paul N Dickson
*Assistant Examiner*—Marlon A Arce Diaz
(74) *Attorney, Agent, or Firm*—Roetzel & Andress (57) ABSTRACT

A powered maneuverable and retractable trailer jack adapted for attachment to a tongue of a trailer has an external sleeve, a gear rack on an exterior of the external sleeve, a housing containing at least one gear engaged with the gear rack and operative to move the external sleeve relative to the housing, the housing including a mount configured for attachment to the tongue of a trailer whereby the external sleeve is laterally offset relative to the tongue of a trailer, an internal rod within the external sleeve, the internal rod extending through a wheel fork at a lower distal end of the internal rod and the external sleeve and attached to a drive gear which is engaged with a shaft gear upon a drive shaft rotationally mounted in the wheel fork, and a drive sprocket attached to the drive shaft, a wheel mounted upon an axle rotationally mounted within the wheel fork, and a wheel sprocket attached to the axle proximate to the wheel, and a chain which extends continuously from the wheel sprocket to the drive sprocket; the lateral offset of the trailer jack relative to the trailer tongue being equal to or greater than a width of the wheel fork.

9 Claims, 15 Drawing Sheets

POWERED MANEUVERABLE AND RETRACTABLE TRAILER JACK DEVICE

FIELD OF THE INVENTION

The present invention is in the general field of mechanical equipment, and more particularly weight bearing and transport equipment.

BACKGROUND OF THE INVENTION

Trailers of the type wherein the trailer tongue is supported by the towing vehicle require a jack stand to support the tongue and trailer frame in a horizontal position when not attached to a vehicle. This is performed by retractable jack stands, also referred to as "trailer jacks", which are attached to the tongue, proximate to the trailer hitch. Trailer jacks on small single axle trailers have a foot plate or a single caster wheel mounted at the lower distal end of the jack. Larger weight capacity trailer jacks typically have a single foot plate which serves as the static support for the trailer tongue when the trailer is parked and unhitched. The smaller trailer jacks with casters are functional only to move the trailer without a load on it, or for very limited movement with a load to facilitate hooking up to a hitch. With the trailer loaded, the total weight is too great for manual movement upon the trailer main wheels and the jack caster.

Some attempts have been made to power trailer jack caster wheels to enable movement of a trailer when loaded. This is advantageous for maneuvering for hook-up with a hitch or maneuvering for parking. It is also advantageous to combine the functions of the jack stand with the mechanical powering of the caster or other translation devices or mechanisms.

Many jack stands are constructed with an external sleeve or housing, such as a steel tube, which is statically mounted to the trailer tongue. The external sleeve houses a screw jack assembly which is coupled to the stand which extends from the housing by operation of the jack. The foot plate or caster is attached to the lower distal end of the of the jack. In another trailer jack design, an external sleeve or housing carries an external gear rack which is mounted to the trailer tongue and engaged with a worm gear operable to raise and lower the jack stand relative to the trailer tongue. This design leaves the interior of the sleeve available for an additional shaft which can be used as a drive and steering shaft for a caster wheel mounted at the lower distal end of the sleeve.

Some of the problems with adding these mechanics to the standard trailer jack include the necessity of more complex housings and mountings. Also, the desirability of a larger wheel and tire in place of a single piece caster wheel requires a larger mounting fork, which then interferes with the retraction of the jack as required for the trailer in the traveling configuration. Satisfactory and economic engineering solutions to these challenges have not been provided.

SUMMARY OF THE INVENTION

The present invention provides a powered maneuverable and retractable trailer jack device for use with trailers of the type having a tongue which extends from or as part of the trailer frame for connection to a tow vehicle. The device includes a jack and a wheel-mounted tire which is powered for rotation to move a trailer by an integral drive mechanism. The jack may be internal or external to a shaft or sleeve which is attached to a trailer tongue, with a gear mechanism mounted to the shaft or sleeve. A wheel drive mechanism is generally internal to a sleeve and includes a chain-driven sprocket assembly to perform powered rotation of the wheel. The device may alternatively be pivotally mounted to a trailer tongue to retract to a stowed position.

These and other aspects and alternative features are described with reference to the accompanying Figures.

DETAILED DESCRIPTION OF PREFERRED AND ALTERNATE EMBODIMENTS

Figure 1:
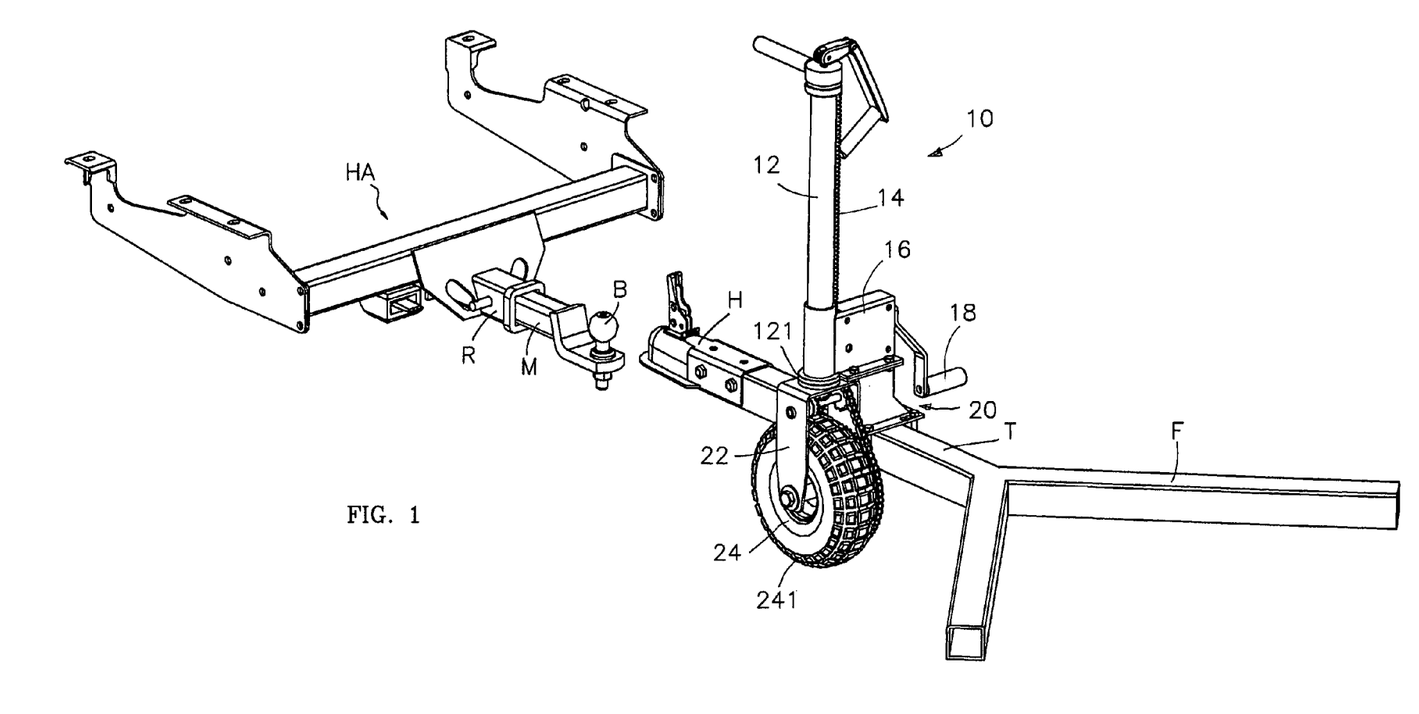
FIG. 1 is a perspective view of a first embodiment of a powered maneuverable and retractable trailer jack of the invention, shown in combination with the tongue portion of a trailer frame and a trailer hitch.
Figure 2:
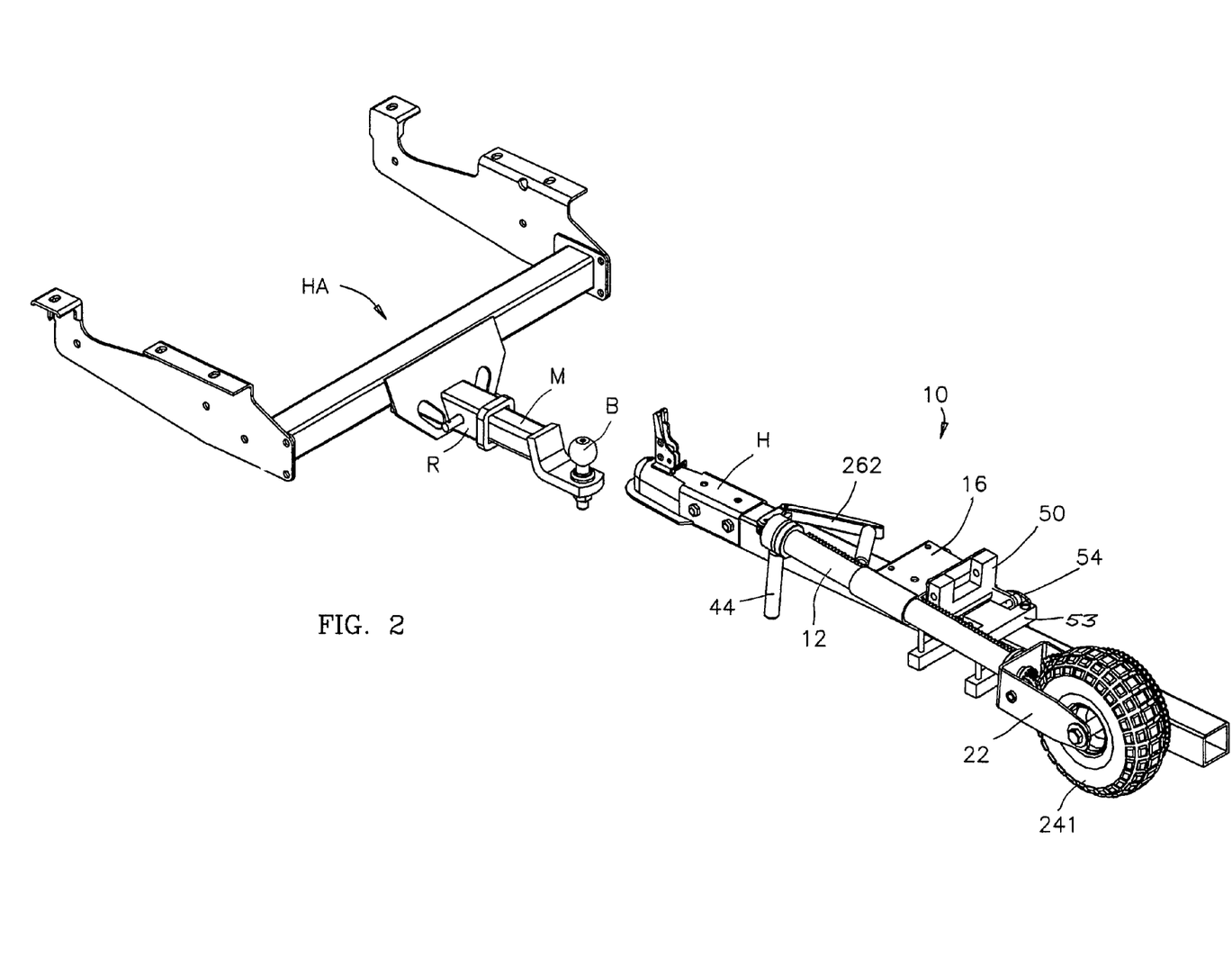
FIG. 2 is a perspective view of another embodiment of a powered maneuverable and retractable trailer jack of the invention, shown in a retracted position and in combination with the tongue portion of a trailer frame and a trailer hitch.

Referring first to FIG. 1, a first embodiment of a powered maneuverable and retractable trailer jack of the invention is indicated generally at 10, in combination with a trailer frame F and specifically attached to the tongue of the trailer frame F, which extends from the forward most end of the frame F to a hitch H, which is adapted to be coupled with a ball as attached to a ball mount M as shown within a receiver R of a trailer hitch assembly HA as are configured for attachment to the frame of a tow vehicle. The invention is not limited to use with these particular types of trailer frames, tongues and trailer hitches and in fact can be used in connection with any type of trailer to which the trailer jack 10 can be mounted.

Figure 3A:
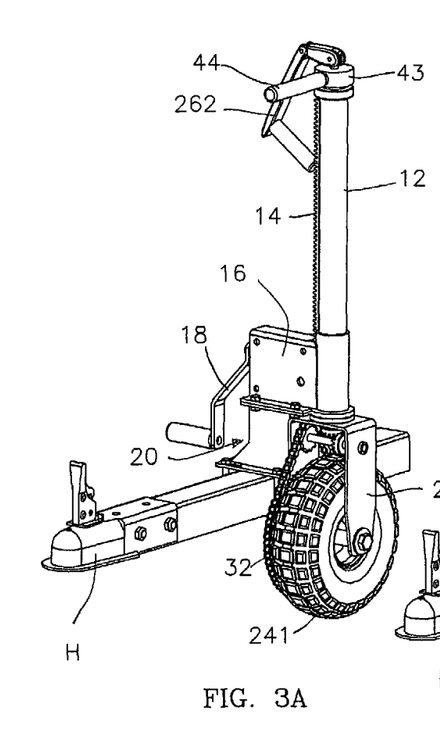
FIGS. 3A and 3B are different perspective views of the first embodiment of the powered maneuverable and retractable trailer jack of the invention as depicted in FIG. 1, attached to the tongue portion of a trailer frame, in a retracted position (FIG. 3A) and in an extended position (FIG. 3B)
Figure 3B:
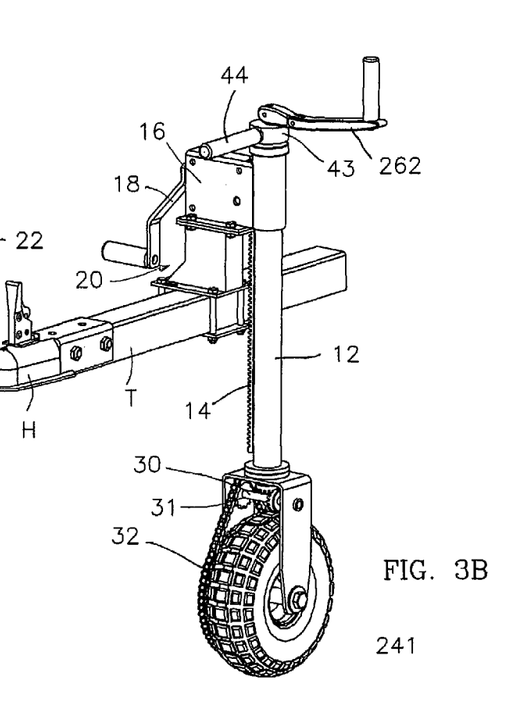
Figures 4A, 4B:
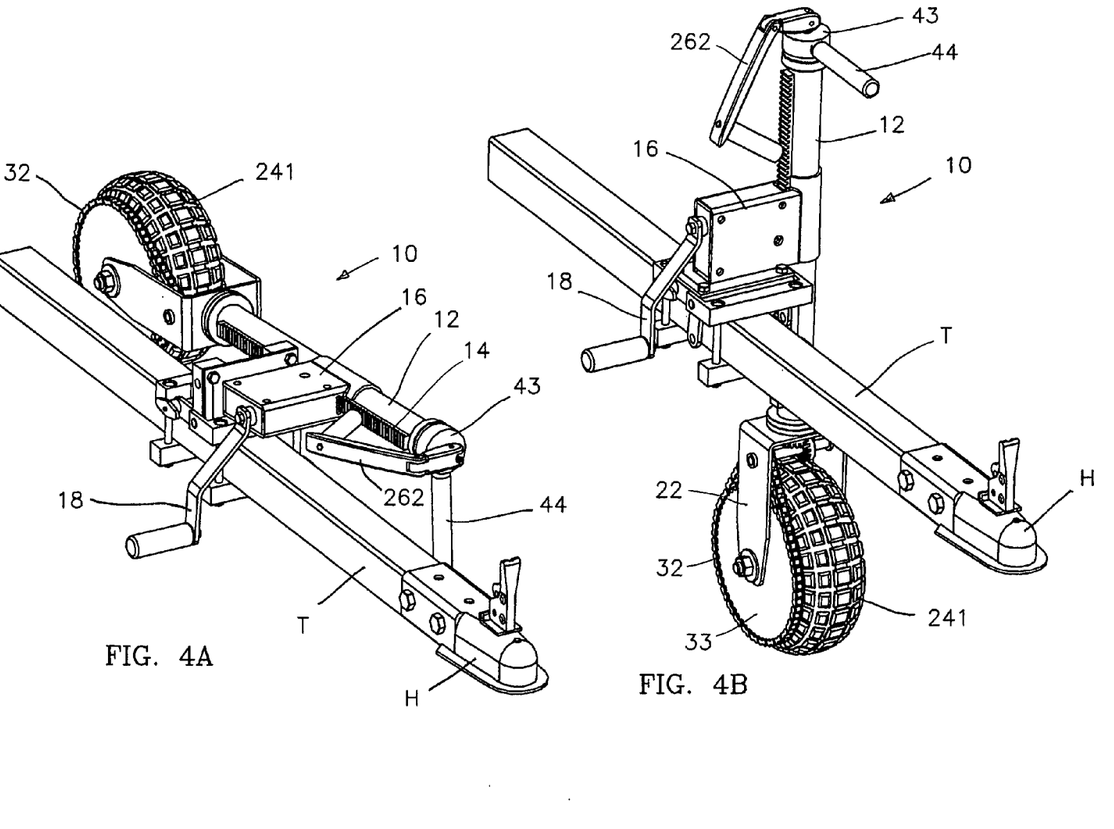
FIGS. 4A and 4B are different perspective views of the embodiment of the powered maneuverable and retractable trailer jack as depicted in FIG. 2, attached to the tongue portion of a trailer frame, in a retracted position (FIG. 4A) and in an extended position (FIG. 4B)
Figure 5A:
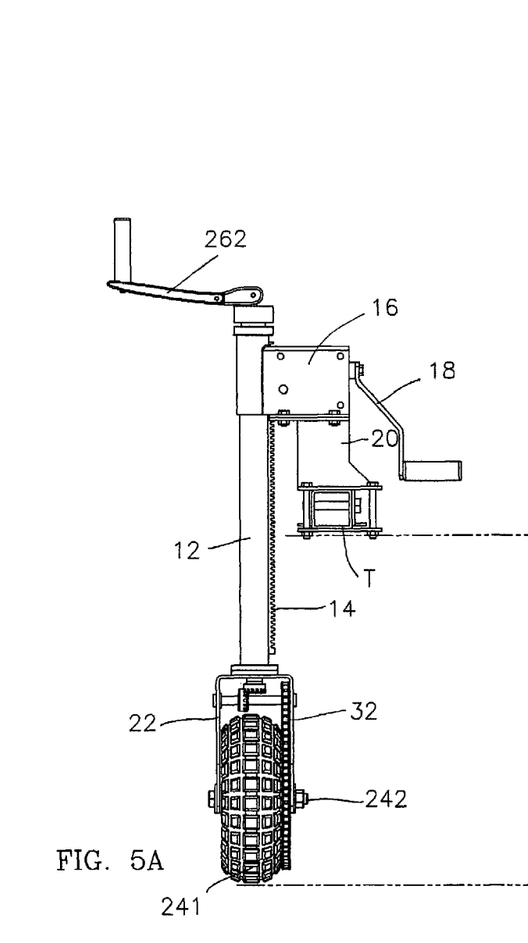
FIGS. 5A and 5B are elevation views of the embodiment of a powered maneuverable and retractable trailer jack of the invention as depicted in FIG. 1, shown in combination with a tongue portion of a trailer tongue of a trailer as shown in cross-section, in an extended position (FIG. 5A) and in a retracted position (FIG. 5B)

The trailer jack 10 includes an external sleeve 12. The sleeve 12 has an external gear rack 14 which is engaged with a drive gear mounted for rotation within a housing 16. The housing 16 is also referred to the rack gear housing. The worm gear can be driven for rotation by a handle 18 to raise and lower the sleeve 12 vertically with respect to the trailer tongue T, as further shown in FIGS. 3A and 3B and in FIGS. 5A and 5B. The housing 16 is mounted to or made integral with a mount 20, a lower portion of which is mounted to a top surface of the tongue T. One manner of attachment of the mount to the trailer tongue T can be by U-bolts which extend around the exterior of the trailer tongue as shown. A lower distal end 121 of the external sleeve 12 abuts the top surface of a wheel fork 22 within which is mounted a wheel 24 and tire 241.

Figure 5B:
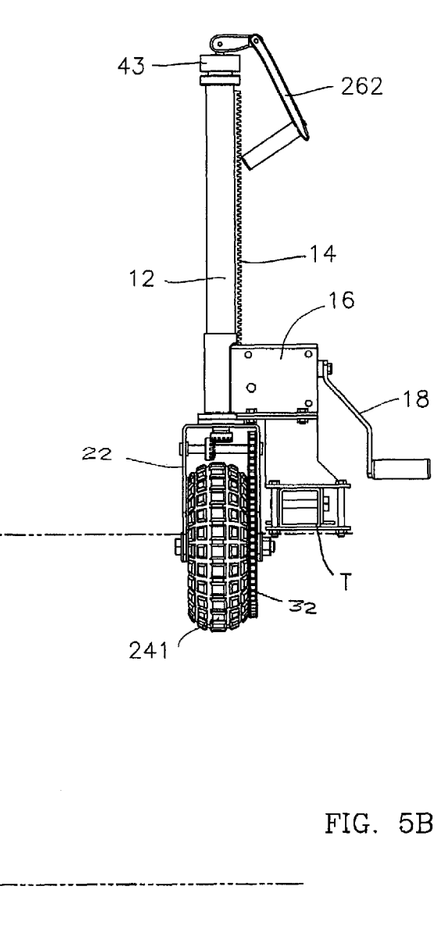

As further shown in the FIGS. 3A, 3B, 5A and 5B, the housing 16 and mount 20 are configured to position the described assembly, and in particular the wheel fork 22, to a position lateral of the trailer tongue T such that the wheel fork 22 and attached wheel 24 can be fully retracted, to the position shown in FIG. 5B, wherein the wheel fork 22 and wheel 24 are laterally adjacent the trailer tongue T and the housing 16 and mount 20. This maximizes the clearance of the wheel 241 from the ground with the trailer in the hitched-up traveling configuration.

The housing 16 and mount 20 can be configured in any manner which accomplishes this lateral offset of the assembly, i.e. trailer jack 10, to maximize ground clearance in the fully retraced position. The mount 20 can alternatively be mounted directly to the housing 16 of a prefabricated retractable trailer jack, in the outboard position as shown to accomplish the lateral offset and enable full retraction.

Figure 6:
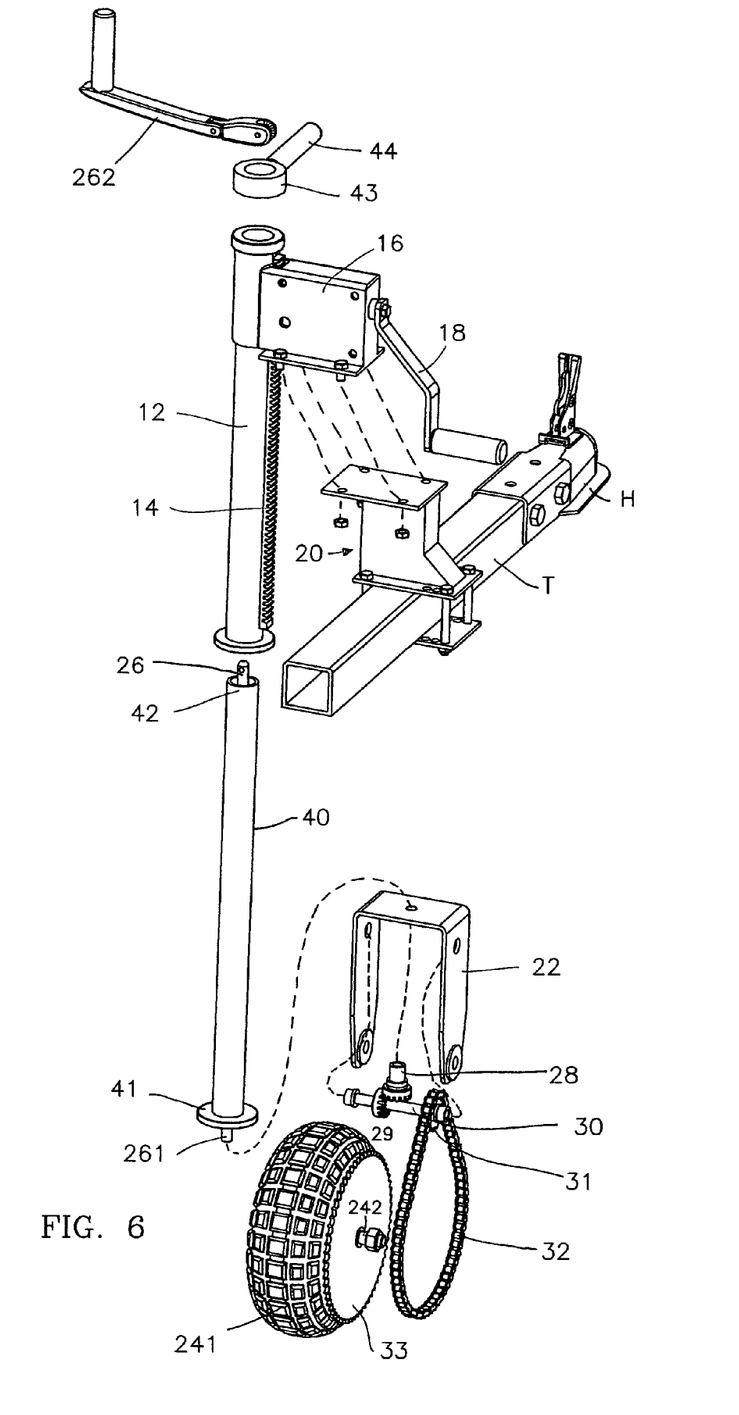
FIG. 6 is an exploded perspective assembly view of the powered maneuverable and retractable trailer jack of the invention as depicted in FIG. 1, shown in combination with a tongue portion of a trailer tongue of a trailer.

As further shown in FIG. 6, an internal rod 26 fits within the external sleeve 12. A lower distal end 261 of the internal rod 26 extends through the wheel fork 22 and to which is attached a drive gear 28. The drive gear 28 is engaged with a cooperating beveled gear 29 mounted axially upon a drive shaft 30, which is journalled to within the distal ends of the wheel fork 22. Also mounted upon the drive shaft 30 is a drive sprocket 31, on which is mounted a chain 32 which extends to engage with a wheel sprocket 33 mounted upon the axle 242 of wheel 24. By this arrangement, axial rotation of the internal rod 26, by manual or powered operation and for example by handle 262, drives axial rotation of the wheel 24 and tire 241 to move the trailer T on its main wheels.

The large geared mechanical advantage from the drive gears 28, 29 to the drive sprocket 31 and the relatively much larger wheel sprocket 33 facilitates the powered motion of the wheel 24 which bears the entire tongue weight of a loaded or unloaded trailer. The design further accommodates a relatively large wheel size and the preferred pneumatic tire 241 which further facilitates motion of a heavy load and over rough surfaces.

To enable turning of the wheel 24, there is also within the external sleeve 12 an internal sleeve 40, within which the internal rod 26 resides. The internal sleeve 40 is mounted at a lower distal end 41 to the top of the wheel fork 22, and attached at an upper distal end 42 to a collar 43 with and a laterally extending handle 44 to turn the wheel fork and wheel 22 about the vertical axis of the internal sleeve 40.

Figures 7A, 7B:
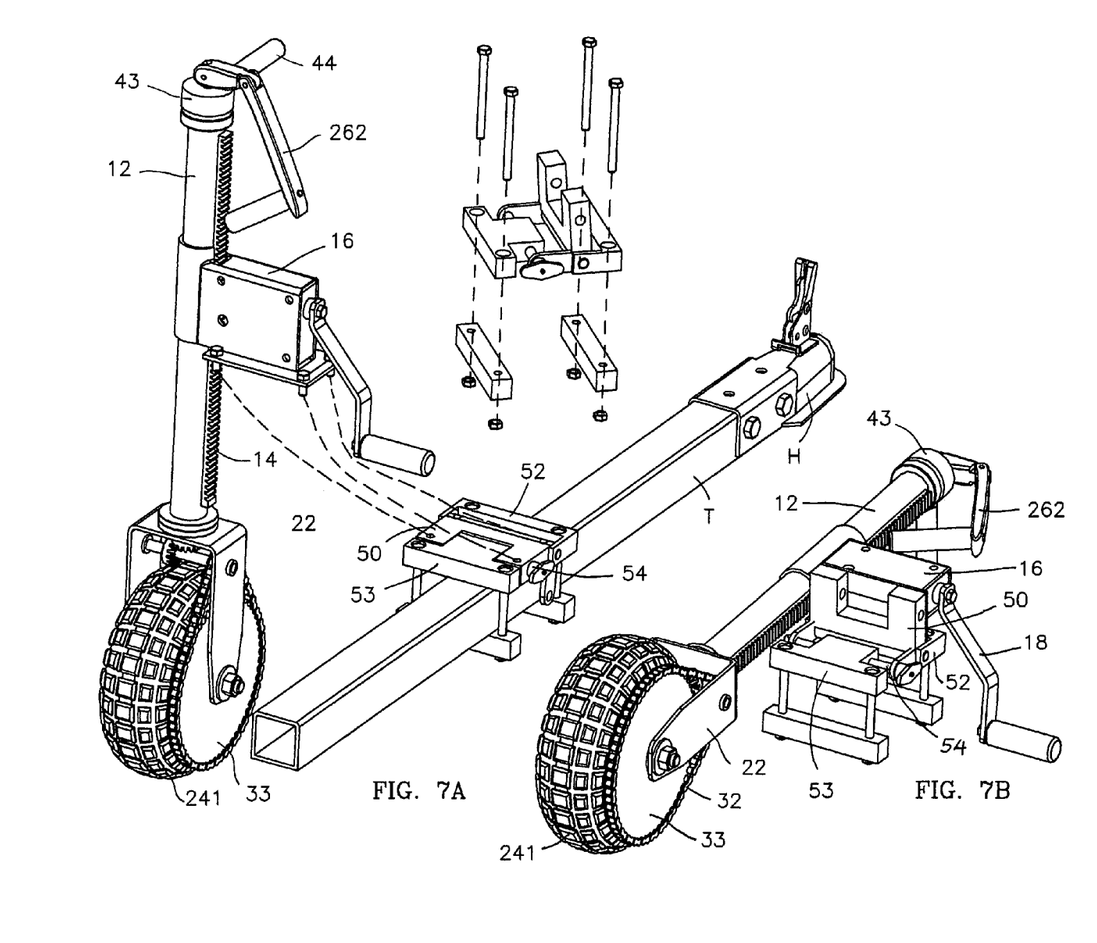
FIG. 7A is a perspective exploded assembly view of the embodiment of a powered maneuverable and retractable trailer jack of the invention as depicted in FIG. 2.
FIG. 7B is a perspective view of the same embodiment of the powered maneuverable and retractable trailer jack of the invention in a retracted position.

FIGS. 2, 4A, 4B, 7A and 7B illustrate an alternate embodiment of the powered maneuverable and retractable trailer jack of the invention, indicated generally at 10, which shares many of the components of the previously described embodiment but differs in the manner in which it is attached to the tongue trailer T. To enable the pivoting retraction as shown, the housing 16 is mounted to a pivotally mounted block 50 which rotates about a hinge pin 51 in a bracket 52 which is mounted to the trailer tongue T. In the flush position shown in FIG. 7A, the block 50 fits with an opposing bracket 53, and a locking pin 54 extends through the block 50 and into the bracket 53 to lock the jack 10 in the pivotally retracted position as shown in FIG. 7B. The mounting of the housing 16 to the block 50 laterally offsets the jack 10 relative to the trailer tongue T so that the jack 10, including wheel fork 22 and tire 241 is positioned adjacent to the tongue T in the fully retracted position for maximum ground clearance. As with the other embodiment, the housing may be formed integral with the blocks 50 and brackets 52, 53, or separately as a prefabricated component which is bolted or otherwise fastened or attached to block 50. The lateral offset of the jack 10 to the trailer tongue T also enables full retraction of the external sleeve 12 prior to the pivoted retraction about the hinge pin 50. The vertical adjustment of the gear rack assembly, and the steering function of the internal sleeve 40 is essentially the same as the other embodiment.

Figure 8:
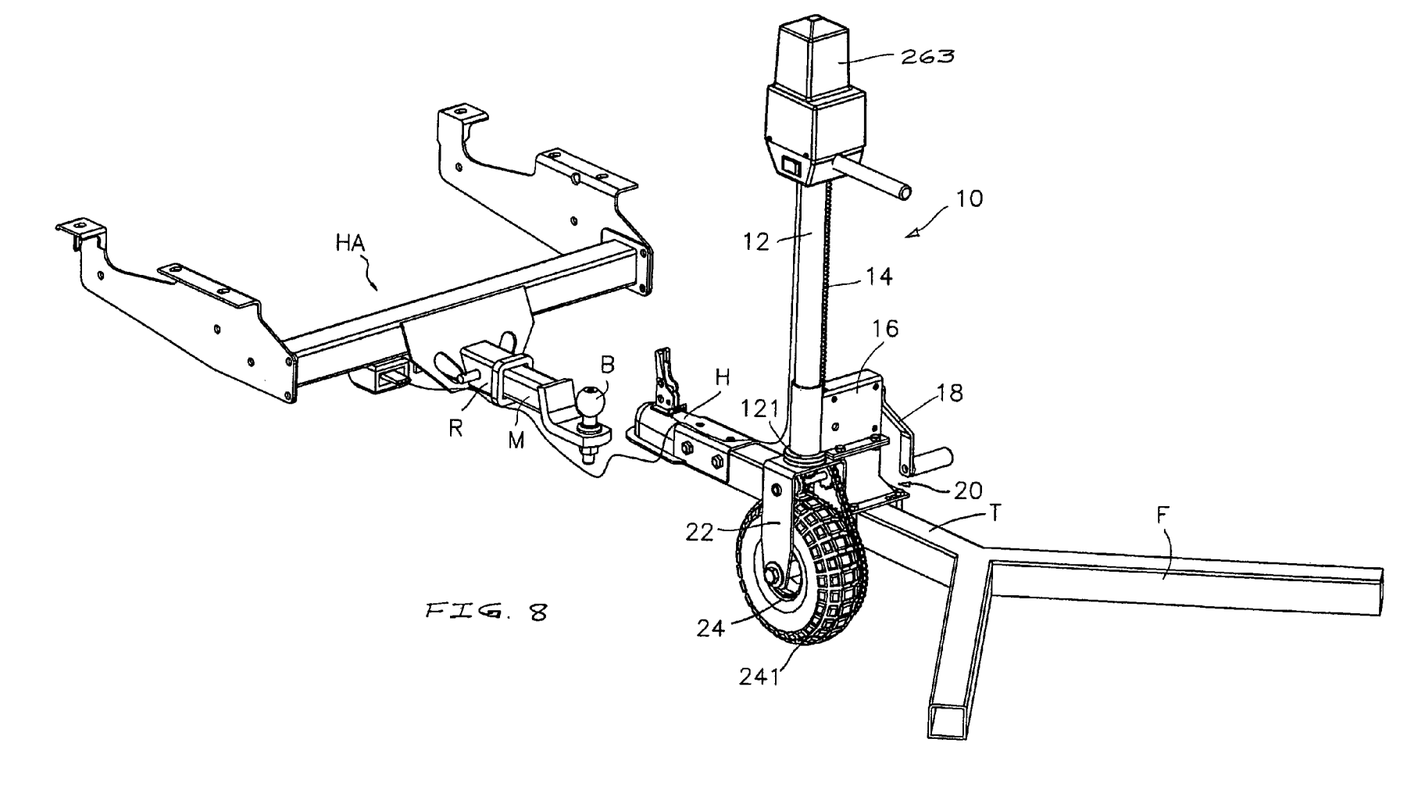
FIG. 8 is a perspective view of another embodiment of a powered maneuverable and retractable trailer jack in a retracted position.

FIG. 8 illustrates an alternate embodiment of a trailer jack 10 wherein the jack assembly includes a motor 263 connected for powered rotation of the internal rod 26 (as shown in FIG. 6) and the powered rotation of wheel 24 through the drive chain described with reference to FIG. 6.

Figure 9:
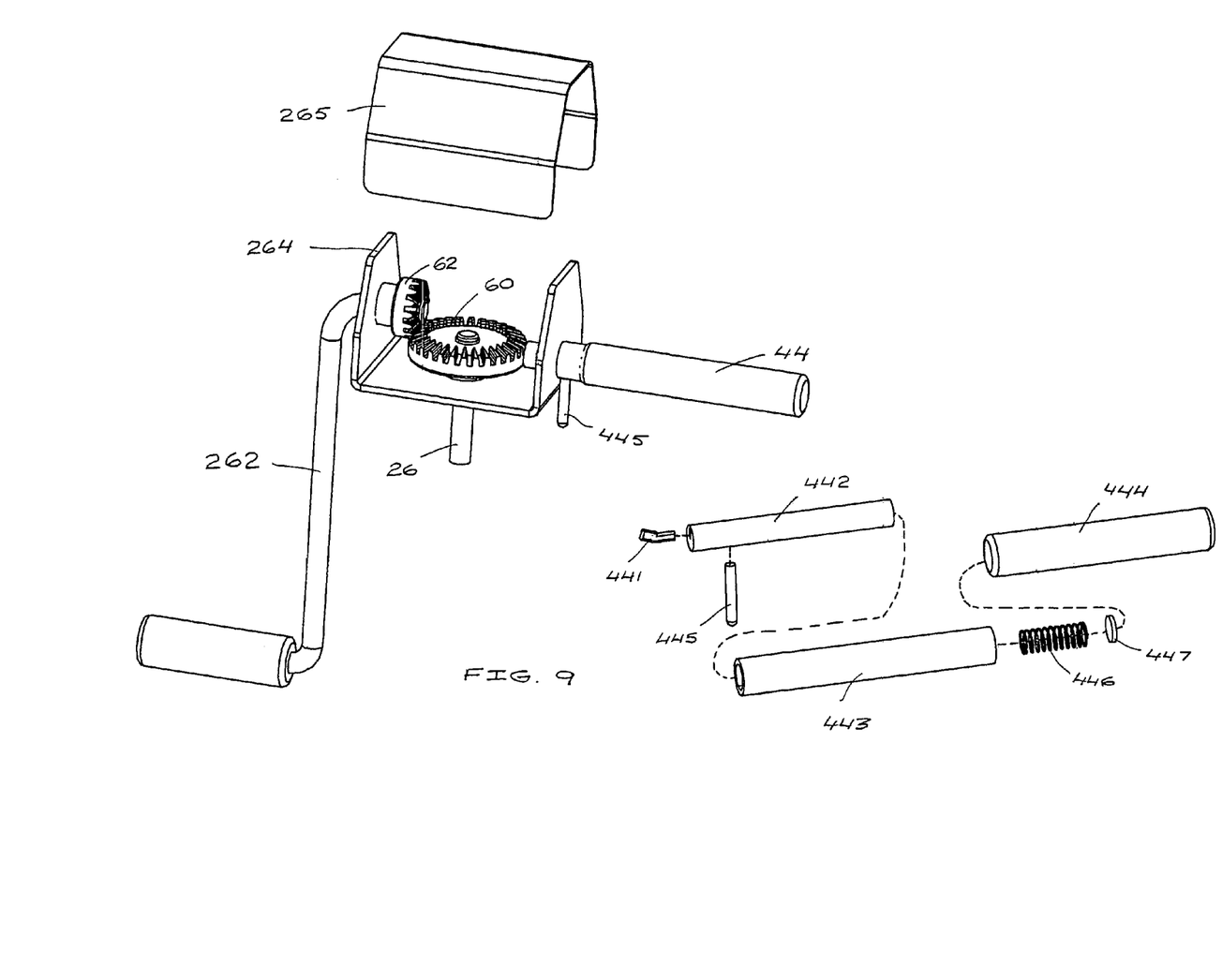
FIG. 9 is an assembly view of a gear drive and steering assembly of the powered maneuverable and retractable trailer jack.

FIG. 9 illustrates an alternate arrangement for the powered rotation of internal rod 26 of the drive train described with reference to FIG. 6. A spur gear 60 is attached to the upper distal end of rod 26. The spur gear 60 is in mesh with a beveled drive gear 62 attached to the end of handle 262 and within a housing 264 and under cover 265. Rotation of gear 62 by handle 262 causes rotation of internal rod 26 to drive wheel 24 as described. The turning handle is mounted through a side wall of the housing 264, and the housing 264 can be attached to the internal sleeve 40 described with reference to FIG. 6 to enable the described turning operation by pivoting of the wheel fork 22. To prevent unwanted rotation of the drive handle 262, such as may occur when the trailer is on an inclined surface, a locking mechanism is incorporated into the turning handle 44, such as in the form of a spring-biased pin 441 which fits within teeth of the spur gear 60. The pin 441 extends from a shaft 442 mounted within a sleeve 443 which forms the handle 44 with a cover 444. A release trigger 445 extends from the shaft 442 through sleeve 443 to disengage pin 441 from gear 60, against the force of pin 446 and cap 447.

Figures 10A, 10B:
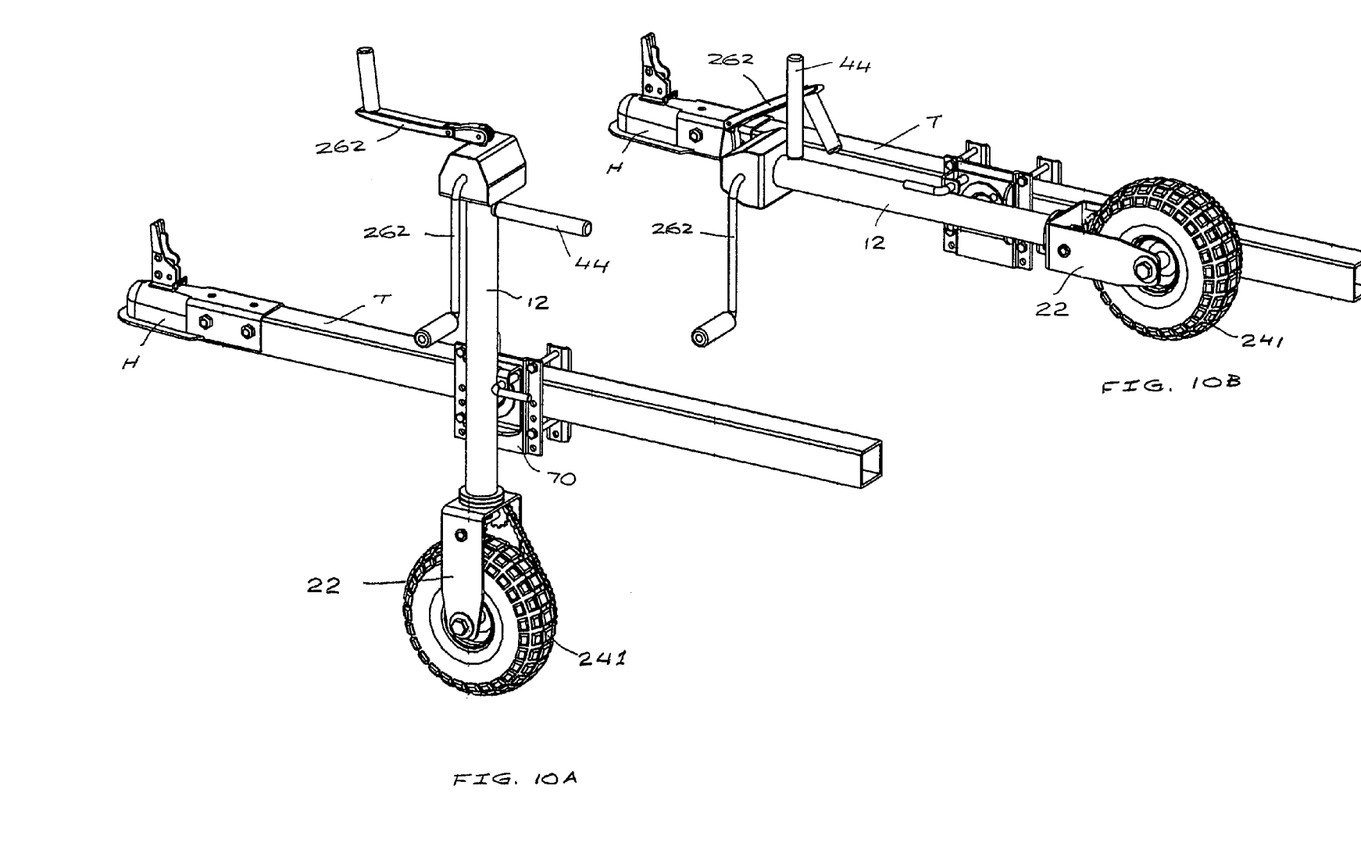
FIGS. 10A, 10B and 10C are perspective views of an alternate embodiment of a powered maneuverable and retractable trailer jack with an internal jack assembly.
Figure 10C:
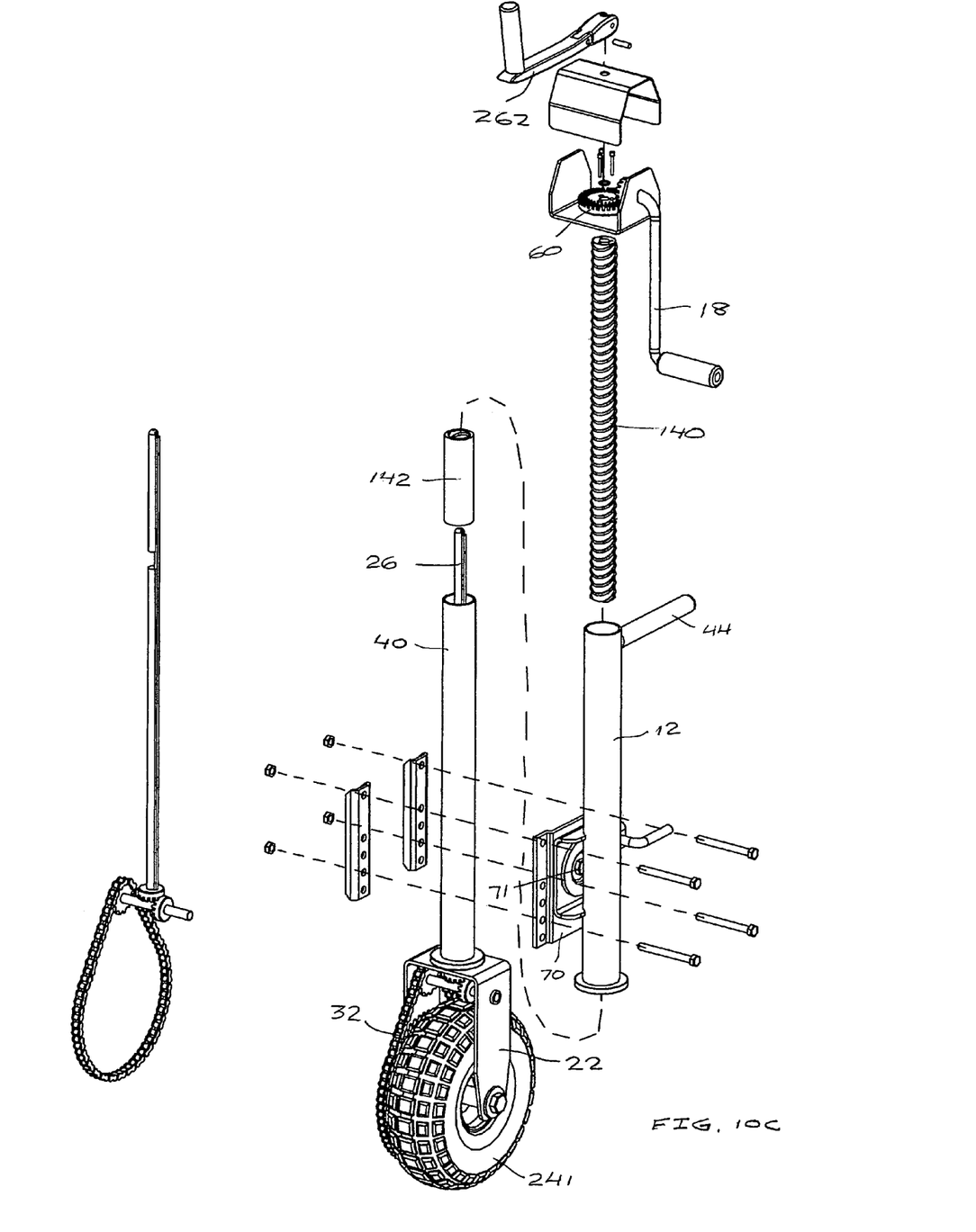

FIGS. 10A-10C illustrates an alternate embodiment of a powered maneuverable and retractable trailer jack 10, wherein the jack function is contained within the external sleeve 12. An internal screw 140 is mounted for rotation within external sleeve 12 and internal sleeve 40, and is threaded through a nut sleeve 142 which also fits within external sleeve 12. The nut sleeve 142 is attached to spur gear 60 as shown, whereby rotation of gear 60 by handle 18 raises and lowers the screw 140 with respect to the nut sleeve 142 within the internal sleeve 40. The external sleeve 12 can be mounted upon a bracket 70 which has a swivel pin 71 to allow the entire jack 10 to rotate relative to the trailer tongue T, as shown in FIG. 10B.

FIGS. 11A, 11B, 11C and 11D illustrate an alternate embodiment of a powered maneuverable and retractable trailer jack 10 in which a gear rack 80 is incorporated into the inner sleeve 40 of the jack, and threaded through a gear box 82 which is mounted on the external sleeve 12. As shown in FIG.

Figures 11A, 11B:
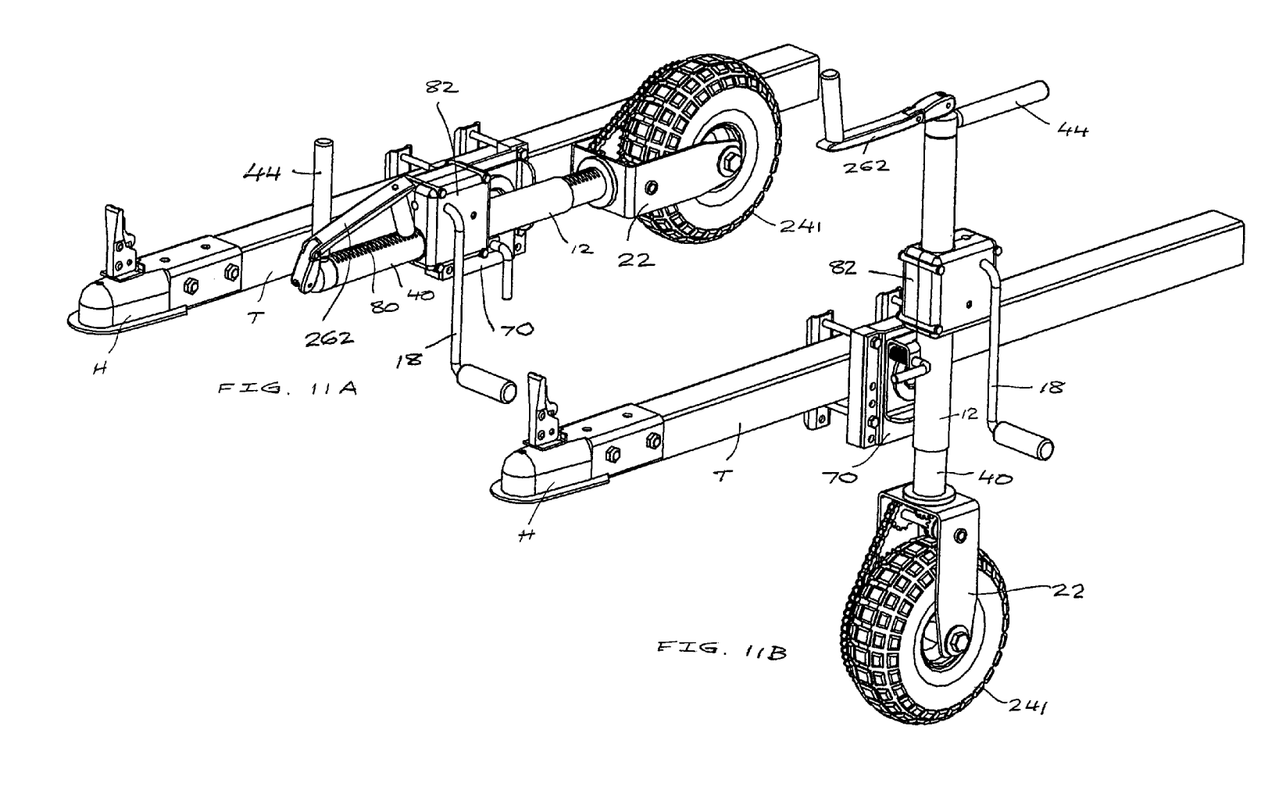
FIGS. 11A, 11B, 11C and 11D are perspective views of an alternate embodiment of a powered maneuverable and retractable trailer jack.
Figure 11C:
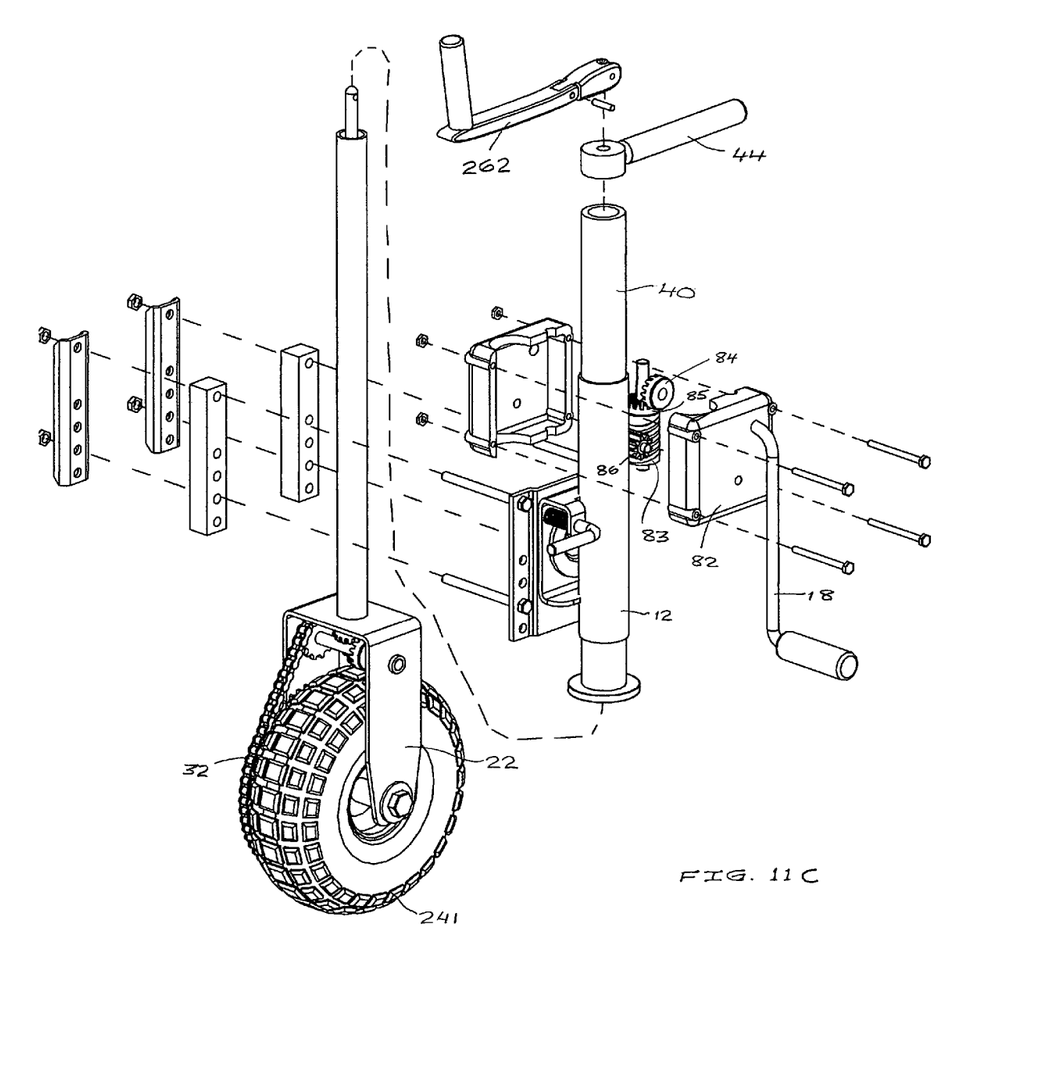
Figure 11D:
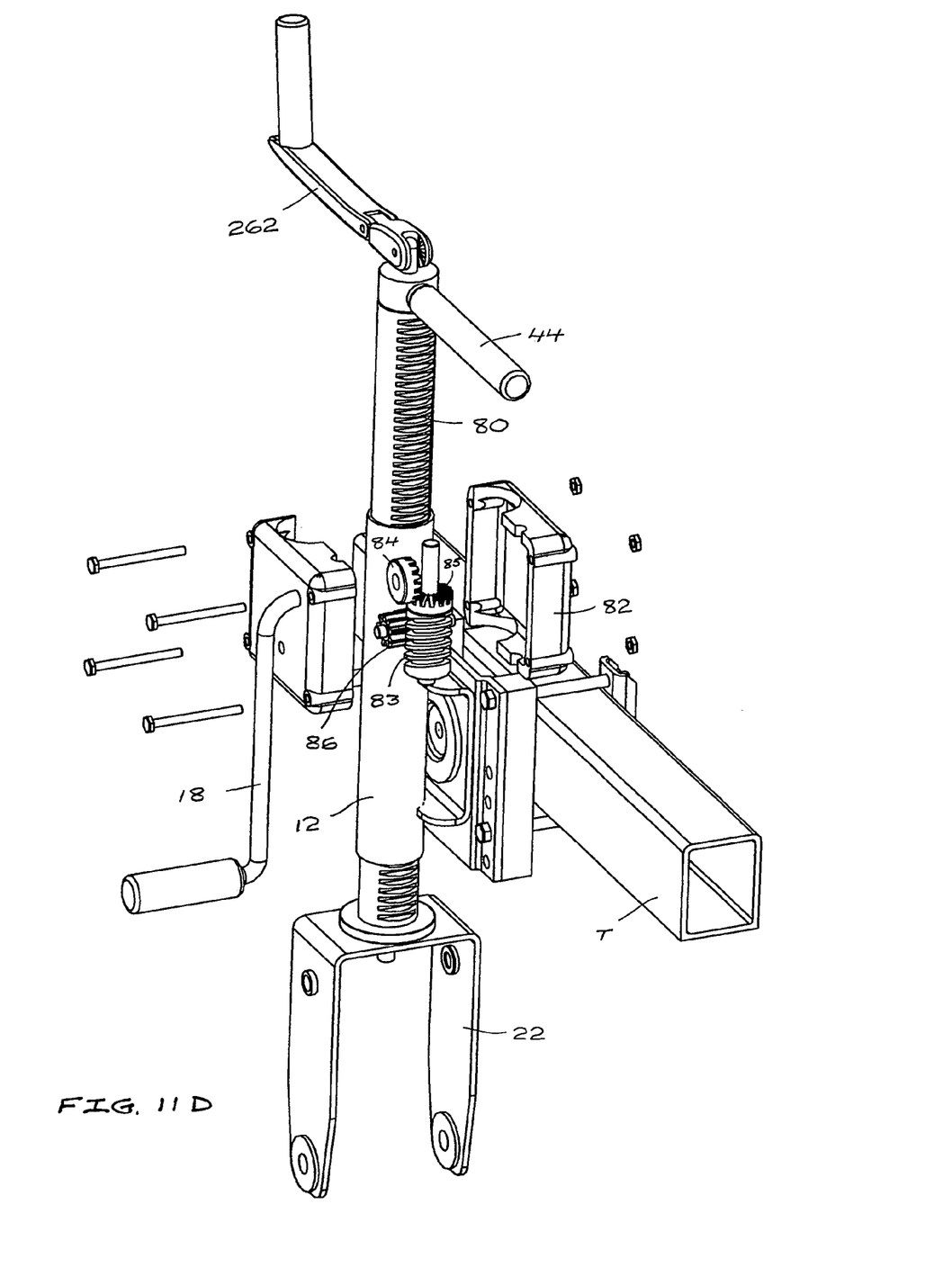

11C, a worm 83 is mounted for rotation within gear box 82, by meshed gears 84 and 85, to rotate rack gear 86 upon the gear rack 80. The outer sleeve 12 is mounted to a pivotable mount 70 as in FIGS. 10A-10C to enable pivoting retraction of the jack as shown in FIG. 11A.

Figure 12:
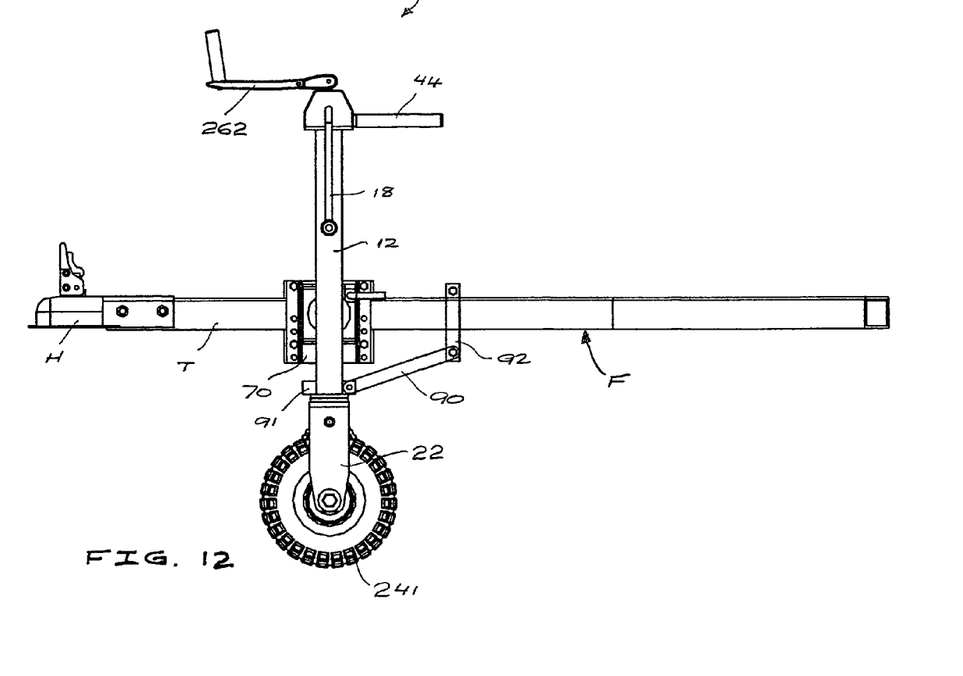
FIG. 12 is a side view of an alternate embodiment of the powered maneuverable and retractable trailer jack.

FIG. 12 illustrates an alternate embodiment of a powered and maneuverable trailer jack 10 mounted to a trailer tongue T by bracket 70 which as described as attached to the outer sleeve 12. A torque arm 90 is provided to extend from a lower end of the sleeve 12, as attached for example by a bracket 91, to the trailer tongue T or to frame F, for example by bracket 92. This provides greater stiffness to the trailer jack 10, particularly in the vertical dimension and along the axis of sleeve 12, which increases the static and dynamic load carrying capacity of the trailer jack 10.

Although these particular embodiments and constructions are shown, other arrangements which perform the described functions are within the conceptual scope of the invention and claims. For example, other types of vertical jacks, including those with gears enclosed entirely within the external sleeve, and hydraulics, can be used in combination with the other operative components to accomplish the same or similar objectives. Also the described mountings can be by fasteners such as bolts or by welding or casting, or otherwise integrated or combined with the trailer tongue or hitch components.

What is claimed as the invention is:

1. A powered maneuverable and retractable trailer jack adapted for attachment to a tongue of a trailer, the trailer jack comprising:
    an external sleeve;
    a gear rack on an exterior of the external sleeve;
    a housing containing at least one gear engaged with the gear rack and operative to move the external sleeve relative to the housing, the housing including a mount configured for attachment to the tongue of a trailer whereby the external sleeve is laterally offset relative to the tongue of a trailer;
    an internal rod within the external sleeve, the internal rod extending through a wheel fork at a lower distal end of the internal rod and the external sleeve and attached to a drive gear which is engaged with a shaft gear upon a drive shaft rotationally mounted in the wheel fork, and a drive sprocket attached to the drive shaft;
    a wheel mounted upon an axle rotationally mounted within the wheel fork, and a wheel sprocket attached to the axle proximate to the wheel, and a chain which extends continuously from the wheel sprocket to the drive sprocket;
    the lateral offset of the trailer jack relative to the trailer tongue being equal to or greater than a width of the wheel fork, and an internal sleeve disposed within the external sleeve and connected at a lower distal end of the wheel fork, the internal sleeve journalled to rotate within the external sleeve and to turn the wheel fork and wheel about a vertical axis.

2. The trailer jack of claim 1 further comprising a handle for operatively connected to gears within the housing for powered movement of the external sleeve relative to the housing.

3. The trailer jack of claim 1 wherein the housing is fastened to the mount, and the mount has a laterally offset portion which positions the trailer jack lateral to the trailer tongue.

4. The trailer jack of claim 1 further comprising a handle for powered rotation of the internal rod for rotation of the wheel.

5. The trailer jack of claim 1 wherein a portion of the wheel fork is located lateral to the mount when the trailer jack is in a fully retracted position.

6. A powered maneuverable and retractable trailer jack adapted for attachment to a tongue of a trailer, the trailer jack comprising:
    an external sleeve;
    a gear rack on an exterior of the external sleeve;
    a housing containing at least one gear engaged with the gear rack and operative to move the external sleeve relative to the housing, the housing attached to a block configured for attachment to the tongue of a trailer whereby the external sleeve is laterally offset relative to the tongue of a trailer, the block mounted by a hinge pin to a bracket attached to the tongue of the trailer whereby the block and trailer jack is pivotable about the hinge pin relative to the trailer tongue;
    an internal rod within the external sleeve, the internal rod extending through a wheel fork at a lower distal end of the internal rod and the external sleeve and attached to a drive gear which is engaged with a shaft gear upon a drive shaft rotationally mounted in the wheel fork, and a drive sprocket attached to the drive shaft;
    a wheel mounted upon an axle rotationally mounted within the wheel fork, and a wheel sprocket attached to the axle proximate to the wheel, and a chain which extends continuously from the wheel sprocket to the drive sprocket;
    the lateral offset of the trailer jack relative to the trailer tongue being equal to or greater than a width of the wheel fork, and an internal sleeve disposed within the external sleeve and connected at a lower distal end of the wheel fork, the internal sleeve journalled to rotate within the external sleeve and to turn the wheel fork and wheel about a vertical axis.

7. The trailer jack of claim 6 wherein the housing is fastened to the block at lateral offset to position the trailer jack lateral to the trailer tongue.

8. The trailer jack of claim 6 further comprising a handle for powered rotation of the internal rod for rotation of the wheel.

9. The trailer jack of claim 6 wherein a portion of the wheel fork is located lateral to the mount when the trailer jack is in a fully retracted position.

* * * * *